April 29, 1924.
S. G. RICHARDS
SIGNAL DEVICE FOR AUTOMOBILES
Filed Feb. 27, 1923   2 Sheets-Sheet 1
1,492,047
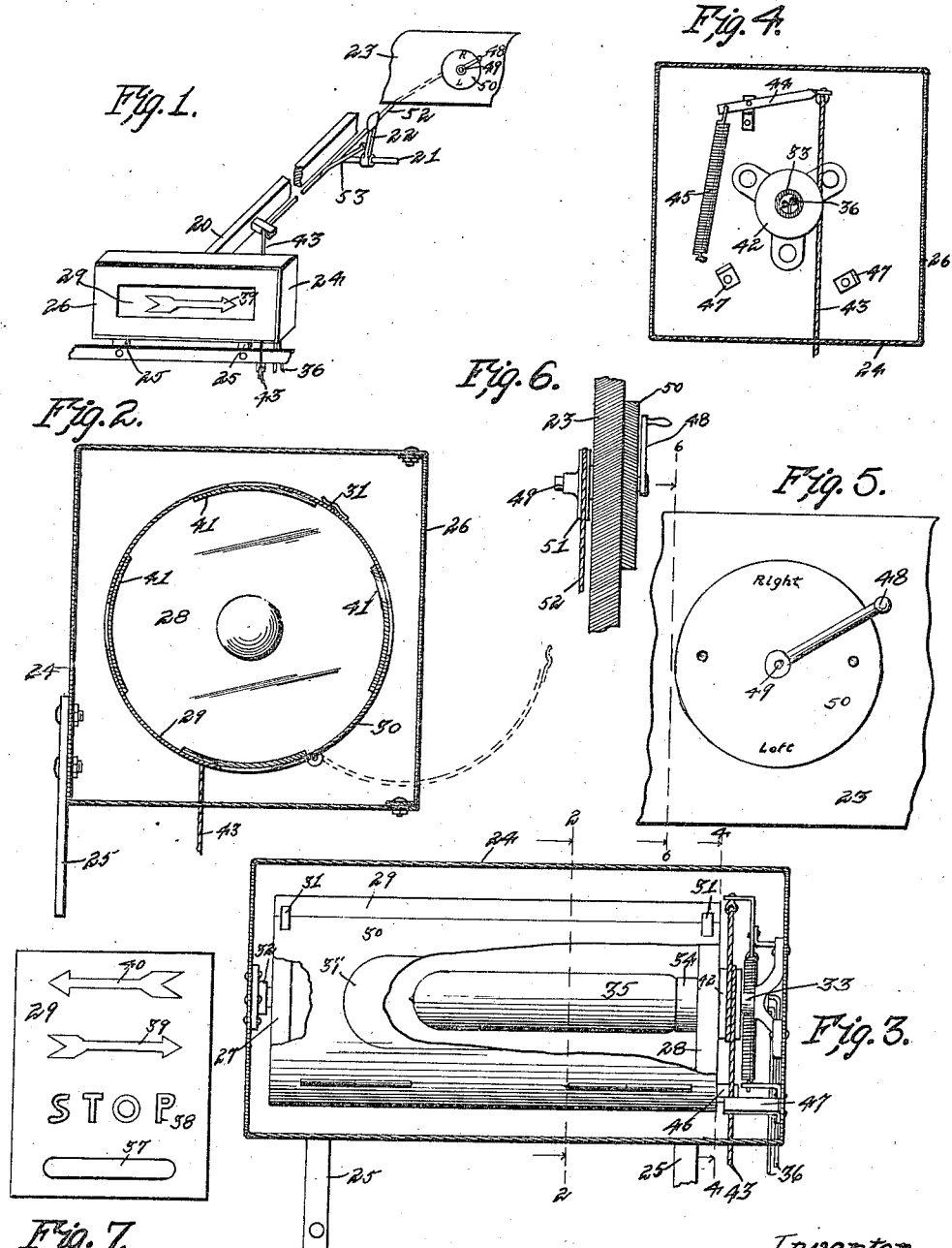

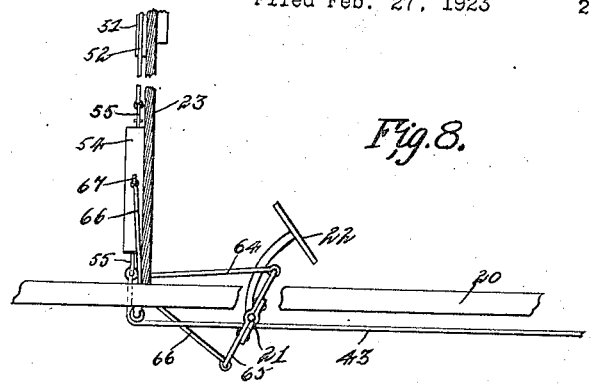
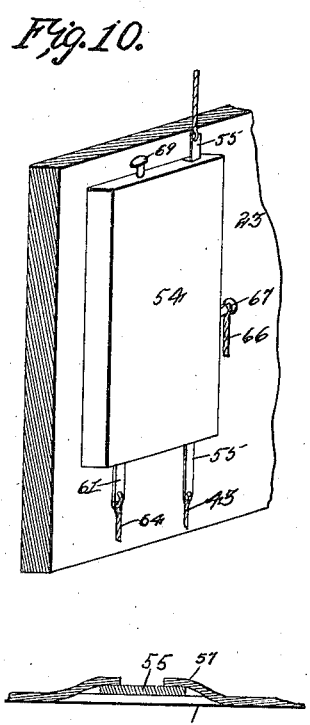
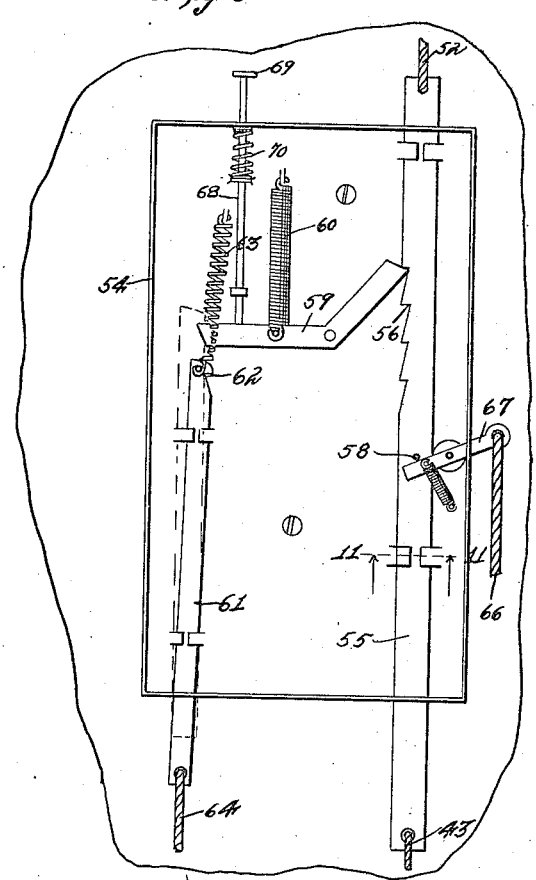

Patented Apr. 29, 1924.

1,492,047

UNITED STATES PATENT OFFICE.

SAMUEL G. RICHARDS, OF DES MOINES, IOWA.

SIGNAL DEVICE FOR AUTOMOBILES.

Application filed February 27, 1923. Serial No. 621,564.

*To all whom it may concern:*

Be it known that I, SAMUEL G. RICHARDS, a citizen of the United States, and a resident of Des Moines, in the county of Polk, State of Iowa, have invented a certain new and useful Signal Device for Automobiles, of which the following is a specification.

The object of my invention is to provide a signaling device for automobiles and the like of simple, durable and inexpensive construction so arranged that when the automobile clutch is released preparatory to stopping the automobile, the signal device will be automatically moved to position for displaying the word "Stop", and when the operator of the automobile desires to turn either to the right or left, he may readily, quickly and easily manipulate a lever to cause the signal to show an indicating device showing an arrow or other device indicating the direction in which the operator intends to turn.

A further object is to provide a device of this kind in which, in the event the operator should set the signal, for instance in a direction indicating that he is going to turn to the right, then after turning, should forget to release the signal so that it would show a red light only, then the signal would be automatically returned to normal position as soon as the operator again threw in the clutch of the automobile after turning the corner.

More specifically it is one of my objects to provide a device of this kind of small and compact form in which only one electric light need be installed for use as a light for illuminating the ordinary red tail light required by law and also for illuminating all of the other indicating devices, such for instance as stop, right and left, or the like; and also to provide a simple and inexpensive structure comprising a stationary casing having only a single signal opening therein, and a rotary cylindrical signaling member in which the electric light is mounted, and which can be rotated so that any one of the various signals will be displayed through the signal opening of the stationary casing; and Further in this connection to provide improved and simplified means for normally returning and yieldingly holding the rotary signal device in position for displaying an ordinary red tail light.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a detail, perspective view illustrating a portion of an automobile frame and dash board having my improved device applied thereto to illustrate a modified form of the connections between the automobile clutch and the signal device, and also between the hand operated lever and the signal device.

Figure 2 shows a transverse, sectional view on the line 2—2 of Figure 3. The dotted lines in this figure show the hinged portion of the rotary signal member in an open position to provide access to the lamp.

Figure 3 shows a vertical, sectional view of the signal casing as viewed from the rear, with a portion of the rotary signal member broken away to show the lamp.

Figure 4 shows a detail, sectional view on the line 4—4 of Figure 3.

Figure 5 shows a rear face view of the hand operated lever device as applied to the automobile dash.

Figure 6 shows a sectional view of same on the line 6—6 of Figure 5.

Figure 7 illustrates diagrammatically the arrangement of the various signaling signs or words on the rotary cylindrical signaling member.

Figure 8 shows a side elevation of a part of an automobile frame, and a vertical sectional view of a part of an automobile dash, and also a portion of the automobile clutch, and illustrating my improved device for manually setting and automatically releasing the rotary signal device.

Figure 9 shows a rear elevation of the mechanism for automatically setting the signaling device in certain positions, and manually setting it in other positions and automatically releasing it.

Figure 10 shows a perspective front view of same with the mechanism enclosed in a casing; and Figure 11 shows an enlarged, detail, sectional view on the line 11—11 of Figure 9.

Referring to the accompanying drawings, I have used the reference numeral 20 to indicate that portion of the automobile frame shown and 21 to indicate the shaft of the automobile clutch.

Mounted on said shaft is a clutch lever 22 of ordinary construction. The portion of the automobile dash shown is indicated by the reference numeral 23.

My improved signal device comprises a stationary casing, preferably rectangular in shape and made of sheet metal and indicated by the numeral 24, and it is intended to be supported on brackets 25 of ordinary construction. Its rear end 26 is preferably made detachable, as shown in Figure 2, and is provided with an oblong opening, as indicated in Figure 1. Within this casing there is a cylindrical rotary signaling member comprising two ends 27 and 28, and a cylindrical sheet metal body portion 29. The latter is preferably provided at one side with a hinged portion 30 provided at its free end with a spring latch device 31, by which it is normally held closed.

The two ends of the signaling member are rotatably mounted on suitable bearings 32 at one end, and a hollow bearing 33 at the other end, and on the interior of the end 28 adjacent to the hollow bearing is an ordinary electric lamp socket 34 into which an electric light bulb 35 is placed. The wires for the electric light are indicated by the numeral 36 and extend through the hollow bearing to the lamp socket. The construction of the casing and cylindrical rotary signal member is very simple, small in size and inexpensive in construction.

Formed in the surface of the cylindrical signal member is a series of indicating marks or words, their arrangement being illustrated in Figure 7. The arrangement which I prefer and illustrate is that the first one of these indicating marks is an oblong opening 37, the next the word "Stop" indicated by the numeral 38, the next an arrow 39 pointing to the right, and the next an arrow 40 pointing to the left. I do not intend to be understood as limiting myself to the specific form of indicating signals, as any other indicating device or word may be used.

These indicating devices or words are preferably made by cutting them out of the sheet metal cylinder 29, and applying to the inner surface over said cut out portions, a sheet of transparent material 41, such for instance as glass or celluloid. The transparent material 41 covering the opening 39 is preferably made of red color, but the others may be of any color desired.

For the purpose of normally holding the cylindrical signaling member in position with the signaling device 37 displayed through the rear of the casing, I have provided a pulley 42 on the hollow bearing member 33, and attached to and wound upon this pulley is a cable 43. The upper end of the cable is attached to a lever 44, and connected to the opposite end of the lever is a contractile coil spring 45 to normally hold the end of the cable in its elevated position, and the parts are so arranged that when the cable is thus held in the position shown in Figure 4, the signal 37 will show through the rear of the casing.

On the cylindrical signal member is a stationary stop 46, and on the stationary casing is a stationary stop 47, the parts being so arranged that when the cylindrical signaling device has been rotated far enough to bring the arrow 40 to position adjacent to the opening in the stationary casing, the stop 46 will engage the stop 47 and prevent further rotation of the cylindrical signaling device.

Mounted upon a suitable portion of the dash 23 is a lever 48 fixed to a shaft 49, and adjacent to the lever is a stationary disk 50 preferably having at its upper portion the word "Right," and the lower portion the word "Left," as shown in Figure 5. The lever frictionally engages the disk.

Mounted upon the shaft 49 is a pulley 51 upon which a cable 52 is fixed and passed around. This cable 52, in the form of the invention shown in Figure 1, is extended rearwardly and connected to the cable 43 so that when the lever 48 is operated, the cables 52 and 43 will also be actuated. In the form of the invention shown in Figure 1 there is a cable 53 connected to the clutch lever 22 and extended rearwardly and connected to the cable 52.

The preferred form of my invention for actuating the cable 43 and turning the cylindrical signaling member comprises a suitable casing 54 fixed to the front of the dash 23, as shown in Figure 8. Within this casing there is slidably mounted a metal bar 55 formed with four notches 56 on one edge, and slidably connected with the casing by means of the lugs 57 formed out of the material of which the casing is made.

Fixed to the lower end of the sliding bar 55 is the cable 43, and fixed to the upper end thereof is the cable 52, and near the central portion of the bar 55 is a pin 58. Mounted in the casing adjacent to the bar 55 is a pawl 59 having one end designed to engage either of the notches 56 and its other end normally extended substantially horizontally away from the bar 55. A spring 60 is arranged to normally hold the pawl in its position in engagement with the bar 55.

Slidably mounted within the casing 54 is a hooked bar 61, its upper end being capable of a slight lateral movement and provided with a hook 62. Connected to its upper end is a spring 63 to normally hold the hooked bar 61 in its elevated position, as shown by dotted lines in Figure 9, and also to hold it laterally in a direction toward the adjacent end of the pawl 59, so that its hook engages said pawl. Connected to the lower end of the hooked bar 61 is a cable 64.

Mounted upon the shaft 21 of the clutch is a lever 65 and the said cable 64 is connected to the lower end of said lever, and another cable 66 is attached to the upper end of the said lever. This cable 66 is also connected to a lever 67, fulcrumed within the casing 54 and designed to normally engage the pin 58 when the bar 55 is at its lower limit of movement, as shown in Figure 9.

In Figure 9 I have illustrated a device by which the pawl 59 may be manually released. It comprises a vertically movable rod 68 having a knob 69 at its upper end and having its lower end resting upon the pawl 59. A spring 70 normally returns it to its elevated position after it has been depressed.

In practical operation, and assuming that the signal device is attached to an automobile and the clutch pedal is in its normal position, then the electric light within the rotary signal member will shown through the red light signal device 37 and through the rear of the casing, and serve as an ordinary tail light.

In the event that the operator of the automobile desires to stop, he ordinarily first operates the clutch lever, and when this is done the cable 66 is drawn downwardly, thus causing the lever 67 to engage the pin 58 and raise the bar 55 until the pawl 59 engages the second shoulder 56 from the top of said bar, whereupon the cable 43 will be pulled far enough to overcome the tension of the spring 45 and rotate the cylindrical signal member a fourth of a revolution and there hold it. And when this is done, the word "Stop" appears through the opening at the rear of the signal casing. At the same time the cable 66 is slackened by the action of moving the clutch brake forwardly, and when this cable is slackened, the spring 63 will elevate the slide bar 61 to the position shown by dotted lines in Figure 9, there being enough lateral movement permitted for the upper end of this bar 61 for this purpose, and when in this position, the pawl 59 will be locked so that the cylindrical signal member will be held in said position without being subjected to the minor fluctuating movement that will ordinarily take place when the clutch is partially released or depressed. When, however, the operator releases the clutch and it returns to normal position, then the cable 64 is pulled rearwardly, thus tripping the pawl 59 and releasing it from the shoulder on the bar 55, and at the same time the tension on the cable 43 is released so that the spring 45 will pull the bar 55 downwardly to normal position where the red light will again show in the signal device.

In the event that the operator desires to indicate on the signal device that he intends to turn to either the right or left, then he manipulates the lever 48 and moves it to position adjacent to the word "Right" or "Left" on the disk 50. When such movement takes place, the cable 42 is operated to raise the bar 55 and consequently pulls the cable 43 to a position, which will rotate the cylindrical signal member so that the desired signal arrow corresponding to the word "Right" or "Left" will be in position to be seen through the rear of the casing, and at the same time the pawl 59 will engage the corresponding one of the shoulders 56 to hold said signal arrow against fluctuating movements that might be caused by the manipulation of the clutch lever.

Ordinarily when turning a corner the operator will release the clutch lever. This, however, will have no effect on the signal device, because the pin 58 will be so far above the lever 67 that it will not be touched. However, after the corner has been turned, and the operator wholly releases the clutch lever, then the cable 64 will be pulled and the pawl 59 tripped, and the bar 55 permitted to return to its normal position.

Hence by means of my improved controlling device it is not at all necessary for the operator to remember to manually release or return the lever 48 to its normal position, because said lever is not locked in position but simply held by friction against the plate 50, and the pull of the spring 45 is sufficient to return the rotary signal member as well as the lever 48 to normal position.

The modified form illustrated in Figure 1 is somewhat simpler in constructon than the form of the device previously described, and its operation is as follows:

When the clutch lever is depressed, the rotary signal device will move to position with the word "Stop" appearing at the rear of the signal device, and when the clutch lever is released, the signal device will be automatically moved to show the red tail light. Upon approaching a turn, the operator may by hand move the lever 48 to position indicating right or left, and when this is done, the cable 52 will be pulled to bring the desired indicating mark to position for showing through the indicating device, and when this is done, the cable 53 leading to the clutch will be slackened. Then after the turn has been made, the operator can again manipulate the lever 48 to normal position.

I claim as my invention:

1. A signal device for automobiles comprising a rotatable signal member formed with a number of signal devices, spring actuated means for returning it to normal position for exposing one of said signal devices, a cable operatively connected with said rotary signal member for moving it from its normal position, said cable being designed to be connected to an automobile clutch in such manner that when the clutch is released the rotatable signal member will be moved to expose another of its signal devices, a notched bar connected to said cable, a spring actuated pawl to co-operate with the notched bar, means for moving the notched bar so that any one of the signal devices may be moved to position to be viewed and held in said position by said spring actuated pawl, and means for releasing said pawl so that the rotary signal member may return to normal position, said means being designed to be connected with and operated by an automobile clutch lever when the clutch lever is returned to normal position.

2. A signal device for automobiles comprising a rotatable signal member formed with a number of signal devices, spring actuated means for returning it to normal position for exposing one of said signal devices, a cable operatively connected with said rotary signal member for moving it from its normal position, said cable being designed to be connected to an automobile clutch in such manner that when the clutch is released the rotatable signal member will be moved to expose another of its signal devices, a notched bar connected with said cable, a pin fixed to the notched bar, a lever adjacent to the notched bar and designed to engage the pin, a cable connected to said lever and designed to be operatively connected with an automobile clutch lever, said parts being so arranged that when the clutch lever is moved to position for releasing the clutch the notched bar will be moved to position for showing one of the signal devices other than the normal signal on the rotary signal member, a cable connected to the notched bar, means for manually moving said cable to different positions to operate the rotary signal member to positions for exposing other signal devices, a hooked bar designed, when moved in one direction, to engage said pawl, and when moved in the other directon, to release said pawl from its position in engagement with the notched bar, a spring for normally moving the hooked bar to position for engaging the pawl, and a cable connected to the hooked bar and designed to be connected to the clutch lever of an automobile for releasing the pawl from engagement with the notched bar when the clutch lever is moved to normal position.

SAMUEL G. RICHARDS.